United States Patent [19]
Dichter

[11] 3,880,637
[45] Apr. 29, 1975

[54] METHOD AND APPARATUS FOR PRODUCING AMPOULES

[76] Inventor: Hans-Joachim Dichter, Sachsendamm 93, 1 Berlin 62, Germany

[22] Filed: July 5, 1973

[21] Appl. No.: 376,880

[30] Foreign Application Priority Data
July 7, 1972 Germany.............................. 2234062

[52] U.S. Cl. ...................... 65/113; 65/270; 65/280; 65/285
[51] Int. Cl............................................. C03b 21/06
[58] Field of Search ............ 65/105, 108, 110, 112, 65/113, 270, 278, 279, 280, 282, 285

[56] References Cited
UNITED STATES PATENTS

| | | | |
|---|---|---|---|
| 2,790,994 | 5/1957 | Cardot et al...................... | 65/113 X |
| 3,150,952 | 9/1964 | Alcott et al....................... | 65/105 X |
| 3,179,508 | 4/1965 | Stapel .............................. | 65/108 X |
| 3,222,157 | 12/1965 | Dichter........................... | 65/105 X |
| 3,424,570 | 1/1969 | Couquelet..................... | 65/108 X |

Primary Examiner—Robert L. Lindsay, Jr.
Attorney, Agent, or Firm—Smythe & Moore

[57] ABSTRACT

The invention relates to a method and apparatus for producing glass ampoules wherein a neck is drawn which is twice the length of a single ampoule neck, from a portion of a vertically held glass tube, which portion is an ampoule body length away from the fused end of the tube. The bottom half of the double length neck is associated with a lower ampoule while the upper half is associated with an upper ampoule. When the double length neck has been formed the bottom part is separated by a glass melting flame. An air jet is applied at the point of separation of the two parts to prevent their open ends from being closed by fusion. The second ampoule is then separated from the glass tube by the melting flame at a point which is one ampoule body length above the upper part of the double length neck still attached to the glass tube.

8 Claims, 1 Drawing Figure

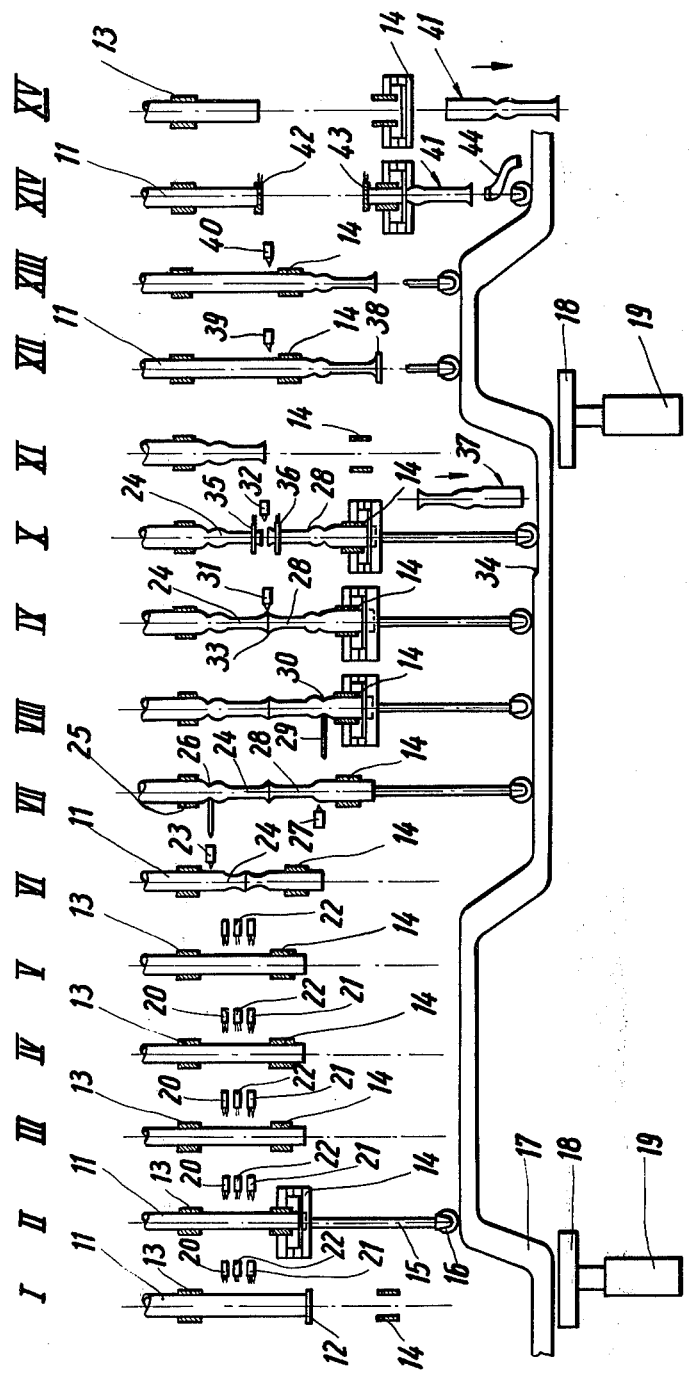

METHOD AND APPARATUS FOR PRODUCING AMPOULES

The invention relates to a method of producing ampoules or similarly shaped glass vials, which comprises drawing a neck of twice the length of a single ampoule neck from a portion of a vertically held glass tube which is an ampoule body length away from the fused end of the tube, the bottom half of said double-length neck being associated with a lower and the upper half with an upper ampoule.

A method of the above kind for the production of double ampoules has already been described (German Pat. Specn No. 889,970). Such double ampoules consist of two ampoule bodies having necks connected end to end, the configuration resembling that of a dumbbell. For their production part of the glass tube is heated and drawn into a double-length neck and the section of glass tube comprising an upper and a lower ampoule body each associated with a normal length neck is then separated by a melting flame from the next following section of tube with the simultaneous formation of a closed bottom on each section. The resultant hermetically sealed double ampoules are later divided into individual ampoules either in a special machine or in a working station of the filling machine. This is regularly done by employing a technique which involves breaking the double-length neck.

This method has not proved to be entirely satisfactory because it is practically impossible to prevent very fine splinters of glass from being drawn into the interior of the ampoules by the vacuum generated during production.

Although the method of producing ampoules in the form of double ampoules is more economical, this circumstance severely limits its employment in practice.

It is therefore an object of the present invention to provide a method of producing ampoules which is practically equal to the conventional method of producing double ampoules, but nevertheless permits single open-ended ampoules to be produced, i.e. ampoules containing no vacuum.

According to the invention this object is achieved by separating the bottom part of the double-length neck from the upper part by means of a glass melting flame as soon as the double-length neck has been formed, by providing an air jet at the point of separation of the two necks to prevent their open ends from being closed by fusion, and by then separating the second ampoule from the glass tube by means of a melting flame at a point which is one ampoule length above the upper neck still attached to the glass tube.

The proposed method has the advantage that without relinquishing the economical advantage of the conventional double ampoule method of production, it nevertheless permits single ampoules to be produced which can be filled without the need of additional operations, and which are also less liable to be damaged in transit than the double-length double ampoules.

Another defect of the conventional method of producing double ampoules is that the bottom of the two ampoule bodies are differently shaped, this being due to the effect of gravity which causes the bottom of the lower ampoule body to be externally somewhat convex and the bottom of the upper ampoule to be more or less concave. Whereas the convex bottom of the lower ampoule can be readily corrected by forming tools, a similar correction of the shape of the concave bottom is not as easily possible. The result is that the capacities of the two ampoules differ.

According to the invention it is possible to produce ampoules of constant capacity by introducing compressed air into the separated second ampoule to press the still soft bottom of this ampoule against a forming tool which is lowered into contact therewith from above.

The invention also concerns a machine for performing the method comprising cooperating pairs of rotating upper and lower chucks which carry the workpieces through a plurality of working stations and of which at least one is adapted to be raised and lowered for the purpose of drawing the ampoule necks, the proposed machine being characterised in that one station is equipped with at least one separating burner and at least one blowing nozzle for dividing the double-length neck into two parts one associated with each of two ampoules, and two stations are provided for delivering completed ampoules and that at least one station for melting the upper ampoule off the glass tube and for forming two bottoms is interposed between the first and the second delivery station, and that in a preferred embodiment a station for forming the ampoule bottom created by separation is provided between the delivery stations and that in the station for forming the bottom of the ampoule provided with the downwardly pointing neck a nozzle is provided for the generation of an air cushion inside the ampoule to press the ampoule bottom against a forming tool.

The invention will be hereinafter more particularly described with reference to an illustrative embodiment which is shown in the accompanying drawing.

The drawing is a diagrammatic representation in the form of a development in the plane of the drawing of the stations comprised in a machine for performing the method according to the invention. The machine actually has the form of a tuntable which carries chucking devices past a plurality of working stations disposed around the periphery of the rotating table. Such machines are well known and have been described for instance in the previously mentioned German Pat. Specification No. 889,970.

The illustrated machine has fifteen stations I to XV. Between stations XV and I a glass tube 11 is allowed to slide down until intercepted by a stop 12. In this position it is gripped by an upper chuck 13 which rotates in synchronism with a lower chuck 14. This latter chuck 14 is adapted to be raised and lowered. It is supported by a push rod 15 which at its bottom end carries a follower roller 16 riding on a cam rail 17. Where the cam rail 17 rises steeply chuck lifting jacks comprising a piston 18 and a cylinder 19 are provided.

The stations I to V each contain two burners 20, 21 and a blowing nozzle 22 interposed between the two burners. The burners 20 and 21 heat the glass tube 11. Cold air issues from the blowing nozzle 22 which cools a tube portion intermediately between two heated portions.

After having passed station V the tube section held between the two chucks 13 and 14 is sufficiently hot to permit a neck to be drawn. For this purpose the lower chuck 14 descends a downward slope of the cam rail 17. At station VII the neck drawing operation is completed.

At station VI an additional burner 23 heats the upper part 24 of the neck at a point where a shaping tool 25 in station VII produces a constriction 26 in the ampoule. In station VII yet another burner 27 softens a point on the bottom part 28 of the neck where in station VIII another shaping tool 29 likewise produces a constriction 30.

It will be understood from the drawing (cf. particularly stations VI–VIII) that the two parts 24 and 28 of the neck are funnel-shaped where they join. This funnel-shaped widening is the result of the cooling of the glass tube 11 by the blowing nozzle 22. If the blowing nozzle were omitted in stations I–V the resultant neck ends would be cylindrical.

At the stations IX and X cutting burners 31 and 32 melt through the necks 24 and 28 at the level of their widest cross section at 33. They cause a very thin slice of glass to melt and thus create the conditions which allow the two necks to be pulled apart. This operation takes place between stations IX and X, and separation is brought about by the follower roller 16 of the push rod 15 riding down a step 34 in the cam track 17 and thus allowing the chuck 14 to descend. During the separation phase air is blown from nozzles 35 and 36 into the open neck ends 24 and 28. The air prevents the separated fused neck ends from closing. Between stations X and XI the lower ampoule 37 is ejected by the machine. Finally the lower chuck 14 rises again, being lifted by a second jack consisting of a piston 18 and a cylinder 19. In station XII the glass tube 11 is allowed to slip down to a stop 38. In this position it is gripped by the lower chuck 14. At the same time the tube is exposed to the convergent flame of a burner 39. In station XIII the glass tube continues to be heated by another burner 40. Between stations XIII and XIV the chuck 14 again descends a step in the cam track 17. This causes the upper ampoule 41 to be separated from the glass tube 11. During this process of separation the bottom of the upper ampoule 41 and the bottom of the next lower ampoule 37 above are formed.

In station XIV the bottoms are shaped by forming tools 42 and 43. The bottom of the lower ampoule of the next pair is pressed against the forming tool 42 by the weight of the glass. In order to ensure that the bottom of the upper ampoule is shaped by the forming tool 43 a nozzle 44 blows air into the ampoule 41. The trapped air forms an air cushion inside the ampoule which pushes the bottom of the ampoule against the forming tool 43. At station XV the forming of the ampoule bottoms has been completed and the ampoule 41 is discharged. Station I then follows station XV.

I claim:

1. A method of producing open mouth single ampoules and glass vials including the steps of drawing a neck of twice the length of a single ampoule neck from a portion of a vertically held glass tube which is an ampoule body length away from the fused end of the tube, the bottom half of said double-length neck being associated with a lower and the upper half with an upper ampoule to provide a double-length neck separating the bottom part of the tube by a glass melting flame from the upper part of the double-length neck, applying an air jet at the point of separation of the two parts to prevent their open ends from being closed by fusion, and separating the second ampoule from the glass tube by applying a melting flame at a point one ampoule body length above the upper part of the double-length neck still attached to the glass tube to form an open mouth single ampoule.

2. A method according to claim 1, wherein compressed air is introduced into the separated second ampoule to press the still soft bottom of this ampoule against a forming tool which is lowered into contact therewith from above.

3. A method according to claim 2, wherein the bottom end of the tube which remains after the separation of the second ampoule is likewise closed and shaped by a forming tool.

4. A method according to claim 1, wherein during the drawing of the double-length neck that part where the neck is to be divided into two parts is cooled to produce funnel-shaped ends on the divided parts.

5. In an ampoule making machine for producing open mouth single ampoules including cooperating pairs of rotating upper and lower chucks to support and carry a glass tube in a vertical position through a plurality of working stations and of which at least one of said chucks is adapted to be raised and lowered for the purpose of drawing the ampoule necks, a first station including at least one separating burner and at least one blowing nozzle for dividing the double-length neck into two parts one associated with each of two ampoules, and second and third stations for delivering completed ampoules, and means for separating and dividing by melting the upper ampoule off the glass tube and for forming two bottoms interposed between the first and second stations.

6. In an ampoule making machine according to claim 5, wherein nozzle means is provided between said second and third stations for the generation of an air cushion inside the ampoule to press the ampoule bottom against a forming tool to form an open mouth single ampoule.

7. In an ampoule making machine according to claim 5, wherein the lower chuck is adapted between the first and second stations to be raised by a cam track for gripping the upper ampoule and to be lowered for separating the upper ampoule from the glass tube.

8. In an ampoule making machine according to claim 5, including an assembly consisting of at least two burners and of a cold air blowing nozzle intermediately therebetween is provided for generating the doublelength neck.

* * * * *